United States Patent [19]

Lewis et al.

[11] 3,934,037

[45] Jan. 20, 1976

[54] FEED COMPOSITION AND METHOD USING 2,3-DIBROMOPROPANOL

[75] Inventors: Joseph J. Lewis; John E. Trei, both of West Chester, Pa.

[73] Assignee: SmithKline Corporation, Philadelphia, Pa.

[22] Filed: May 2, 1974

[21] Appl. No.: 466,114

[52] U.S. Cl. .............................................. 424/343
[51] Int. Cl.² ..................................... A61K 31/045
[58] Field of Search ................................... 424/343

[56] References Cited
UNITED STATES PATENTS 3,660,562  5/1972  Grass et al. .......................... 424/78
3,663,710  5/1972  Parish et al. ......................... 424/343

OTHER PUBLICATIONS

Chemical Abstracts, Vol. 54 (1960), p. 21603c.

*Primary Examiner*—V. D. Turner
*Attorney, Agent, or Firm*—William H. Edgerton

[57]  ABSTRACT

Methods and compositions for increasing the feed efficiency of ruminant animals using 2,3-dibromopropanol as an active ingredient. The method comprises administering the active ingredient orally to growing ruminant animals in quantities sufficient to induce inhibition of methanogenesis in the rumen.

5 Claims, No Drawings

FEED COMPOSITION AND METHOD USING 2,3-DIBROMOPROPANOL

This invention relates to an advantageous new method and composition for improving the feed efficiency of ruminant animals using 2,3-dibromopropanol as an active ingredient. This method and composition uses oral administration to the subject animal of an effective but not toxic or noxious quantity of the active dibromopropanol ingredient to inhibit methanogenesis in the rumen. One result is a decrease in gaseous loss of carbon and hydrogen during fermentation and alteration of rumen metabolism to affect a shift toward producing a larger proportion of fatty acids more desirable for growth especially propionic acid. This acid is more readily utilized by the ruminant to increase the efficiency of rumen digestion of feed to give more weight gain on the same or less ingested feed.

The active ingredient of this invention is 2,3-dibromopropanol which is a well known chemical of low chemical cost. It has, in the art, been used for preparing flameproofing agents (*Chem. Abst.* 76 13805) and for other synthetic purposes. As far as we know it has been described in the literature to have certain biological effects external to the body for example antifungal activity (*Chem. Abst.* 52 13173) or herbicidal activity (*Chem. Abst.* 54 21603). No internal application of the active ingredient is, to our knowledge, known to the art, nor is any utility known in the veterinary or feed additive fields. The chemical, as noted above, is commercially available or may be prepared by the methods described in U.S. Pat. No. 3,268,597 or B.P. 1,090,767.

2,3-Dibromopropanol is a high boiling liquid which tends to hydrolyze on long exposure to water such as when dispersed or dissolved in aqueous media. The liquid nature of the compound may at times be an advantage in preparing supplemented animal feed. It may be dissolved or dispersed in liquid form in an extender then merely sprayed onto the animal feedstock. Alternatively the dibromopropanol may be converted to a solid product prior to administration by addition to an adsorbent carrier. It may also be coated by spray drying or congealing techniques known to the art for volatile veterinary products such as U.S. Pat. No. 3,660,562.

The dibromopropanol may also be reacted chemically to form other derivatives such as an ester or ether derivative. The chemistry of preparing such derivatives is well known to the art. Basically any common chemical reaction for esterifying or etherifying alcohols may be used such as reaction with an acid chloride, anhydride or mixed ester in the presence of a tertiary base, to form the ester or with a reactive halo derivative to form the ethers. As a practical matter the added acyl or ether portions of such dibromopropanol derivatives should be limited to moieties having a maximum of 10 carbon atoms since the antimethane activity described herein derives primarily from the 2,3-dibromopropanol portion of the derived compounds. The derivatives therefore may be formed from functional compounds known to the art to give branched or straight, saturated or unsaturated, unsubstituted or substituted alkyl, aryl or aralkyl ethers or esters of the dibromopropanol. Especially preferred are ester or ether derivatives known to have antimethanogenesis activity in the ether or ester portion of the compound such as those derived from polyhalo acids, for example, polychloro or polybromoacetic or propionic acids.

The potent ability to inhibit methane formation of the rumen possessed by the dibromopropanol active ingredient of this invention is completely unexpected from the knowledge of the prior art and from comparison of other structurally similar compounds. For example, U.S. Pat. No. 3,608,087 discloses that trihaloethanols, specifically trichloroethanol, have antimethane activity. But the structural limitations of the active ingredients of this patent preclude the art from either going to a longer chain alcohol such as propanol or going to a α-mono halo substituted compound. Another prior art reference, U.S. Pat. No. 3,615,649, also discloses that polyhaloacetaldehyde derivatives have antimethane activity. Once again this disclosure teaches away from the use of higher carbon skeleton compounds or mono-α-halo substitution. The active ingredients of the present invention therefore differ from the teachings of the art in two parameters (a) being a three carbon chain compound and (b) having a single α-bromo substituent.

The activity of the 2,3-dibromopropanol active ingredient of this invention compared with that of its 2,3-dichloropropanol congener in the in vitro methane reduction procedure described in U.S. Pat. No. 3,660,562 demonstrates at least a tenfold greater activity for the compound of the present invention: 120 p.p.m., 94%; 60, 93%; 12, 95%; 6, 79%; 3, 58%. The 2,3-dichloro: 120, 97%; 12, 0%, 6, 0%; 3, 0%; the 3-bromo 6, 0%. Other isomers of the 2,3-dibromopropanol also have potent anti-methane activity and are included in this invention, such as 1,3-dibromo-2-propanol: 12, 80%; 6, 30%.

The reduction in methane production in vitro by 2,3-dibromopropanol was accompanied by a shift in volatile fatty acid production as follows:

| PPM | Total VFA $\mu$m/ml | Molar % VFA $C_2$ | $C_3$ | $C_4$ |
|---|---|---|---|---|
| Control | 160.5 | 60.0 | 18.9 | 16.4 |
| 6 | 168.1 | 58.6 | 19.1 | 17.5 |
| 12 | 162.2 | 55.7 | 19.7 | 19.1 |
| Control | 207.5 | 63.3 | 17.0 | 16.1 |
| 120 | 171.3 | 60.0 | 19.7 | 17.5 |

Also using the method described in U.S. Pat. No. 3,660,562, 2,3-dibromopropanol was tested in vivo distributed throughout a basic sheep diet comprising:

| | % w/w |
|---|---|
| Mixed Ground Hay 13% | 40.0 |
| Soybean Meal 44% | 7.0 |
| Dried Molasses(Sweetone) 87% equiv. | 8.0 |
| Dicalcium Phosphate | 0.5 |
| Trace Mineral Salt | 0.5 |
| Ground Corn | 43.1 |
| Vitamin A Premix (30,000 units/Gm.) | 20 Gm./ton |
| Vitamin $D_2$ Premix (16,000,000 units/lb.) | 8.5 Gm./ton |
| Limestone (ground) | .5 |
| Urea | .4 |
| 2,3-Dibromopropanol | 1 g./head/day |

The following results show confirmation of the in vitro studies by feeding this ration to sheep to give 1 g./head/day of 2,3-dibromopropanol.

| Treatment | Vol % Cases | | Methane Reduction |
|---|---|---|---|
| | $CO_2$ | $CH_4$ | |
| Control | 70.5 ± 2.3 | 16.9 ± 1.0 | — |
| 2,3-dibromopropanol | 65.2 ± 5.6 | 6.5 ± 2.5 | 61.3 |
| Control | 66.2 ± 4.5 | 33.8 ± 5.3 | — |
| 2,3-dibromopropanol | 77.1 ± .1 | 11.0 ± 3.7 | 67.4 |

| | Control | 2,3-Dibromopropanol |
|---|---|---|
| Total VFA (mM/l) | 78.9 ± 6.6 | 117.1 ± 23.6 |
| Molar % | | |
| $C_2$ | 56.6 ± .3 | 46.9 ± 3.2 |
| $C_3$ | 30.8 ± 3.0 | 44.1 ± 2.8 |
| $C_4$ | 12.7 ± 3.0 | 9.0 ± 5.9 |
| Total Free AA (Av µM/ml) | 3.0 ± .6 | 3.7 ± .8 |

The ruminant feeds often used in conjunction with the method of this invention are based on the roughage feeds such as hay, silage or various commercial grain mixtures commonly used in ruminant animals, that is, in cattle or sheep. The method is most usually employed in healthy ruminant animals especially in immature meat producing animals such as feeder sheep or cattle. The amount of additive will be an amount sufficient to improve the feed efficiency of the animal but not have a toxic, noxious or overtly pharmacodynamic effect; in the range of about 10–1000 g. per ton of feed (roughly about 0.01–0.1%) preferably from about 50–300 g. per ton of dibromopropanol equivalent. A ratio of 100 g. per ton of whole feed is particularly of use. An average 80 lb. sheep will ingest about 3–4 lbs. of food daily; cattle up to about 25 lbs. of dry matter. The upper parts of the broad range disclosed here are most useful in cattle, the lower in sheep.

The liquid active ingredient per se may be extended with an aqueous or oily liquid material as known in the art then uniformly mixed with a premix or whole feed material. Alternatively the ingredient may be evenly applied to an absorbtive solid carrier such as kieselguhr then mixed uniformly with a premix or whole feed material as noted hereafter.

For commercial use, the active ingredient is most readily used admixed with a basic premix formulation in which the chemical is distributed uniformly throughout a standard animal feed in carrier in concentrated form. This premix or concentrate is then mixed with either a normal or a special fattening diet of the ruminant as desired by the grower or the mixer. Examples of such carriers are soybean meal, corn oil, ground corn, barley, wheat, mineral mixtures such as vermiculities, diatomaceous earth, corn gluten meal, corn distillers solubles or soyflour. The active ingredient will be in amounts to satisfy the criteria set forth above for whole feed. The active ingredient will usually be present in from 5–75% by weight of the premix compositions.

The whole animal feeds themselves may also contain cellulosic roughage such as cellulose, hay, straw, corn stalks, oats, barley, and cereal brans; natural oils such as animal fats, fish oils, and whale oil; vegetable oils such as soybean oil, olive oil, safflower oil, peanut oil, and cottonseed oil or anti-oxidants. Other additives such as minerals, vitamins, antibiotics, anthelmintics or any appropriate feed additives known to the art may be present in either or both the premix or complete feed compositions.

A typical prepared animal feed is as follows:

| Mix hay | 40.0% |
|---|---|
| Ground yellow corn | 45.0 |
| Soybean oil meal | 7.0 |
| Cane molasses | 7.0 |
| Dicalcium phosphate | 0.5 |
| Trace minerals salt | .5 |
| Vitamin A | 300 I.U./lb. |
| Vitamin D | 150 I.U./lb. |
| 2,3-Dibromopropanol | 100 g./ton of feed |

An example of a suitable premix is as follows

| 2,3-Dibromopropanol | 150 g. |
|---|---|
| Ground yellow corn | to 5 lb. |

This mix is added to a ton of feed.

Another is a 50—50 mixture of 2,3-dibromopropanol and vermiculite.

In the field the active ingredient may be administered by means of salt or molasses blocks. A typical block is prepared using the following proportions:

| Ingredient | Weight percent |
|---|---|
| Dried cane molasses | 44.54 |
| Ground soybean hulls | 19.90 |
| 2,3-Dibromopropanol | 10.00 |
| Granulated salt | 21.59 |
| Trace minerals and vitamins | 0.20 |
| Stabilized animal fat | 1.11 |
| Moisture | 2.66 |

The method of this invention comprises allowing the ruminant subject, cattle or sheep, to feed ad libitum on the supplemented rations or to be restricted by being fed on pasture or under feed lot conditions.

As examples of the typical animal an 80 lb. sheep may ingest from about 0.1 to 1.5 g. of the active ingredient per day while a 1000 lb. cow may ingest from about 1–6 g. of dibromopropanol per day. The range of active ingredient for a typical animal subject will therefore range from about 0.1–6 g. per day.

What we claim is:

1. A method for improving the feed utilization of ruminant animals comprising administering orally to such animals a quantity of 2,3-dibromopropanol which is within the range of about 0.1–6 g. per ruminant per day and which is effective for improving the feed efficiency of the animals but which does not have a toxic or noxious effect.

2. The method of claim 1 in which the 2,3-dibromopropanol is administered in an animal feed composition containing about 10–1000 g. per ton of feed.

3. The method of claim 2 in which the amount is about 50–300 g. per ton of feed.

4. The method of claim 1 in which the animal is an immature feeder sheep and the quantity of 2,3-dibromopropanol is about 1 g. per day.

5. The method of claim 1 in which the animal is immature feeder cattle and the quantity of 2,3-dibromopropanol per animal is from about 1–6 g. per day.

* * * * *